United States Patent
Hempel et al.

(10) Patent No.: US 8,013,857 B2
(45) Date of Patent: *Sep. 6, 2011

(54) METHOD FOR HYBRID RASTERIZATION AND RAYTRACING WITH CONSISTENT PROGRAMMABLE SHADING

(75) Inventors: Shawn Hempel, Munich (DE); Michael McCool, Waterloo (CA)

(73) Assignees: Realtime Technology AG, Munich (DE); Serious Hack Inc., Waterloo, Ontario (CA)

( * ) Notice: Subject to any disclaimer, the term of this patent is extended or adjusted under 35 U.S.C. 154(b) by 95 days.

This patent is subject to a terminal disclaimer.

(21) Appl. No.: 12/103,099

(22) Filed: Apr. 15, 2008

(65) Prior Publication Data

US 2008/0211804 A1    Sep. 4, 2008

(51) Int. Cl.
G06T 15/50  (2011.01)
G06T 15/60  (2006.01)
G06T 17/00  (2006.01)
G06T 1/00   (2006.01)

(52) U.S. Cl. ........................ 345/426; 345/418
(58) Field of Classification Search .............. 345/426
See application file for complete search history.

(56) References Cited

U.S. PATENT DOCUMENTS

| | | | |
|---|---|---|---|
| 6,825,840 B2 * | 11/2004 | Gritz | 345/426 |
| 6,894,696 B2 * | 5/2005 | Dawson | 345/582 |
| 7,012,604 B1 * | 3/2006 | Christie et al. | 345/426 |
| 7,289,119 B2 * | 10/2007 | Heirich et al. | 345/427 |

OTHER PUBLICATIONS

McCool et al., "Shader Metaprogramming," Graphics Hardware (2002), pp. 1-12.*
Erik Reinhard. Scheduling and Data Management for Parallel Ray Tracing. PhD thesis. Department of Computer Science. University of Bristol. Oct. 1999.*
Timothy Purcell et al. Ray Tracing on Programmable Graphics Hardware. Proceedings of ACM SIGGRAPH. 2002. pp. 703-712.*

* cited by examiner

*Primary Examiner* — Kee M Tung
*Assistant Examiner* — Jacinta Crawford
(74) *Attorney, Agent, or Firm* — Greenberg Traurig, LLP

(57) ABSTRACT

A method of generating a computer image wherein secondary raytrace vectors are calculated for the image after the image is rendered using rasterization. The secondary raytrace vectors are based on virtual camera angles that are stored during the rasterization process. The raytrace vectors can be calculated using the same processor as the rasterization, thereby providing greater consistency in the image. A metaprogrammed shader can also be applied to the generated image, wherein the shader uses the same processor as the raytrace and rasterization steps. The metaprogrammed shader allows the shader algorithm to be segmented for streamlined processing by the processor.

6 Claims, 2 Drawing Sheets

METHOD FOR HYBRID RASTERIZATION AND RAYTRACING WITH CONSISTENT PROGRAMMABLE SHADING

FIELD OF THE INVENTION

The present invention relates to the field of computer-generated visualizations, and more specifically provides a method for efficiently rendering consistently shaded visualizations.

BACKGROUND OF THE INVENTION

Most computer graphics today use rasterization or raytracing to generate images. Rasterization and raytracing are two fundamentally different graphics techniques. In rasterization, all the modelling primitives used to describe the scene are projected towards the display, and the pixels covered by each primitive are determined. A per-pixel depth test is then applied to determine which primitive is visible in each pixel. This process is described in more detail by Tomas Akenine-Möller and Eric Haines, *Real-Time Rendering*, (2nd Ed., 2002). The second, raytracing, works backwards from the display. In raytracing, the modeling primitive that is visible in each pixel is determined by shooting rays into the scene. This process is described in more detail by Andrew S. Glassner, *Introduction to Raytracing* (1989), and Matt Pharr and Greg Humphreys, *Physically Based Rendering* (2005).

Rasterization, currently the most widespread method for the display of interactive 3D content, is supported by hardware acceleration. Rasterization uses polygons as modelling primitives, and each object in the display is drawn on a polygon by polygon basis. Each polygon consists of a sequence of vertices, with shader attributes attached to each vertex. Each polygon is projected into the device coordinate system and the depth $z(x,y)$ and colour $c(x,y)$ of all points $(x,y)$ inside each polygon are calculated from the depth and shader attributes at the vertices. To compute the colour $c(x,y)$ of a point $(x,y)$ on a polygon, an interpolation first over each polygon edge and a second interpolation over the row from the left to the right edge of the polygon, or some other equivalent method for interpolating attributes between vertices, is used. A shader program is then invoked to compute a colour for each point from the interpolated vertex attributes.

Each sampled point is called a fragment, and is written to an array of colour values called the frame buffer. Each value in the colour value array corresponds to a pixel on the screen. As color values are calculated and added to the array, only the colour due to the fragment closest to the eye (also referred to as the fragment having the minimum depth) is typically retained. This is accomplished by using a second array in which the depth associated with each pixel is stored. As a new colour value is calculated for a fragment, the depth of that fragment is compared to the depth associated with a given pixel. Only fragments with depths smaller than those currently in the frame buffer are allowed to update the colour and depth buffers.

Because rasterization is able to draw near real-time frames through its leveraging of specialized hardware devices, known as graphics processing units or GPU's, many programmers prefer to use rasterization in dynamically generated scenes. However, rasterization has several disadvantages. One such disadvantage is rasterization tends to produce highly local effects. That is, effects which extend beyond the context of the current polygon or pixel are difficult or impossible to compute accurately. Such effects include reflections, refractions, and indirect (global) illumination. Thus, rasterization is not as effective for generating realistic effects in some simulated environments.

More specifically, rasterization assumes an image formation process that maps straight lines in the scene to straight lines on the display. This is mathematically equivalent to stating that rasterization assumes that the projection from scene points to image points is along a set of rays which all pass through a common point. However, images formed by reflections and refractions due to curved objects, for example, do not map straight lines in the scene to straight lines in the image. Indirect illumination algorithms, in turn, may require the transport of information over many divergent paths that do not pass through a common point and so cannot be interpreted as a polygon rasterization. This is described in more detail in Philip Dutré et al., *Advanced Global Illumination* (2003). As a result of these shortcomings, the scenes generated by rasterization tend to look less realistic than is typically desired.

Modern graphics hardware also supports programmable shader programs. Shader programs can be invoked per fragment to convert interpolated attributes to pixel colours, as described above, or per-vertex, to support programmable projection. Graphics hardware that supports shaders typically includes a plurality of very high performance floating-point arithmetic units that allow near-simultaneous shading of many fragments or vertices. Such parallel shading techniques typically involve having all shaders execute the same instruction at once, in a single-instruction multiple-data (SIMD) mode of execution. This data-parallel computational model leads to high performance and efficient use of computational resources, but does not easily support efficient data-dependent control flow (iteration and conditional execution dependent on computed values). Nevertheless, shaders are important in high-quality rendering since they are used to simulate accurate material properties. Shaders can also read interpolated data from external arrays called texture maps. Texture maps are usually used to store images that are then pasted on surfaces, but they can be used for many other purposes, such as storage of data structures.

Raytracing is an alternative algorithm for image generation, and is described in more detail by Andrew S. Glassner, *Introduction to Raytracing* (1989), and Matt Pharr and Greg Humphreys, *Physically Based Rendering* (2005). To create an image with raytracing, for every pixel to be displayed, at least one ray is sent and followed from a virtual eye point through the pixel. The colour values of the objects hit by the appropriate ray are calculated by interpolating attributes between vertices and then invoking a shader. The result is used to determine the colours of the respective pixel.

To calculate a reflection or refraction, a new "secondary" ray is generated from the intersected surface point, and the ray tracing algorithm is called recursively. However, it should be noted that secondary rays generated from curved surfaces may not meet at a common eye point. Generally, ray tracing is much more flexible than rasterization since each ray is characterized separately with a start point and a direction. For example, for indirect illumination, we may just want to trace a set of rays to transfer information throughout a scene without an explicit image formation process. Raytracing can also easily be used to calculate accurate soft shadows, depth of field due to lens systems, glossy reflections, and other effects difficult or impossible to implement with rasterization. This is described in more detail by Robert L. Cook et al, *Distributed Ray Tracing*, in Proceedings of ACM SIGGRAPH 137-145 (1984), which is incorporated herein by reference in its entirety.

The fundamental operation required by raytracing is the intersection of a ray with the polygons in the scene. This is implemented by finding the first intersection point along the ray from its origin point with a specific polygon. Raytracing intersection calculations are very time intensive, since any ray might intersect any polygon in the scene. Thus, raytracing is mostly used for the generation of images where quality is the principal factor. Existing attempts at interactive ray tracing use multiple processors in massive clusters, but still do not even approximate the speed and efficiency of rasterization.

SUMMARY OF THE INVENTION

Currently, users of real-time visualization and graphics systems, such as, without limitation, virtual prototyping systems, consumer video games, commercial flight simulators, and military combat simulators, demand the very high performance typically associated with rasterization, and the global effects, especially in terms of reflections and refractions, typically associated with raytracing. At the same time, they want the accurate and programmable material properties provided by shaders. A hybrid method that uses mainly rasterization but invokes raytracing when necessary would address the needs of many practical applications. It is desirable that such a method does not show a visible difference between image parts rendered using different methods. For example, the objects visible in reflections, which are traditionally computed using raytracing, should have the same surface properties when computed with programmable shaders as those visible directly (i.e. computed with rasterization).

Accordingly, the present invention is directed to a method of hybrid rasterization and raytracing with consistent programmable shading that substantially obviates one or more of the problems due to limitations and disadvantages of the related art. Additional features and advantages of the invention will be set forth in the description which follows, and in part will be apparent from the description, or may be learned by practice of the invention.

The hybrid method described herein allows more consistent evaluation of pixel properties (e.g. color, brightness, depth) because the rasterization and raytracing steps use the same shaders. This is in contrast to the prior art, in which different shaders are used for rasterization and ray tracing. In such prior art, even where care is taken to utilize similar algorithms, the pixel properties are not consistently evaluated because a rasterization shader is usually executed by the GPU (Graphical Processor Unit), whereas a ray tracing shader is usually executed by the CPU (Central Processing Unit). The resulting pixel property differences are simply due to the different processors using slightly different calculation techniques. These different calculation techniques may result in calculation results that are similar out to the tenth to fifteenth position after decimal point, but even such slight calculation differences can cause visible differences in color, brightness, and the like. Therefore, it is an object of the invention to use the Graphics Processing Unit ("GPU") for both shading in both raytracing and rasterization since the GPU hardware is optimized for corresponding image processing methods and is therefore much faster than a normal CPU.

The hybrid method described herein also allows more consistent evaluation of pixel properties because, in one embodiment, the raytracing step occurs subsequent to an initial rasterization of the image. In a typical raytraced image, an incoming ray may intersect with a polygon at a point that is between to pixels. A secondary ray spawned from that intermediate position can have properties different from those spawned from a pixel location. By rasterizing the image first, and then spawning secondary rays from the pixel locations, a more consistent image can be created. Thus, it is an object of the invention to spawn secondary rays from pixel locations in a rasterized image.

It is another object of the method described herein is to accurately evaluate and render reflections, including interfering reflections, in windshields, side windows, and the like.

It is still another object to properly calculate the visualization of vehicle headlights and other lamps.

The objectives and other advantages of the invention will be realized and attained by the structure particularly pointed out in the written description and claims hereof as well as the appended drawings.

The method described in this application offers a solution that combines the efficiency of rasterization with the correctness of raytracing. It can use the same hardware mechanism and shader programs to achieve the desired effect. Also disclosed is a new approach to efficiently computing raytraced intersections on hardware traditionally used for rasterization. The hybridization technique used here could be used in conjunction with any raytracer algorithm, including others that run on graphics accelerators such as those described in Timothy J. Purcell et al., *Ray Tracing on Programmable Graphics Hardware*, in Proceedings of ACM SIGGRAPH, 703-712 (2002) and Tim Foley, Jeremy Sugerman, *KD-Tree Acceleration Structures for a GPU Raytracer*, in Proceedings of ACM SIGGRAPH/Eurographics Graphics Hardware (2005), which are incorporated herein by reference in their entirety. Many other applications are also possible, including, without limitation, whenever efficient but accurate global illumination effects are desired in combination with programmable shaders.

Also utilized herein is a metaprogramming dynamic shader compilation system similar to that described in Michael McCool, et al., *Metaprogramming Shaders*, in Proceedings of ACM SIGGRAPH/Eurographics Graphics Hardware, 57-68 (2002), which is incorporated herein by reference in its entirety. This system is used to combine shaders with a raytracing framework to implement the method.

Transformation of the shader program inputs and outputs is advantageous when implementing the method described below. The dynamic shader compilation system, which also natively supports generative metaprogramming, can facilitate such transformations.

In a metaprogrammed shader programming system, sequences of operations are recorded in a data structure referred to as an intermediate representation. This is described in Michael McCool, et al., *Shader Algebra*, in Proceedings of ACM SIGGRAPH (ACM Transactions on Graphics 23(3)) 787-795 (2004), which is incorporated herein by reference in its entirety. A dynamic compiler can then transform and combine programs represented in this data structure before mapping them to a particular target. Shader programs may be generated on the fly to implement a raytracing algorithm and combine it with preexisting shaders using shader algebra operators.

A metaprogramming toolkit, referred to herein as Sh, includes an embedded parser that permits the specification of programs using a high-level language syntax directly inside the interface of a C++ library. Sh permits dynamic generation (generative metaprogramming) of Sh programs by the host application program. Sh may include a compiler component that dynamically transforms user-specified computations as necessary and prepares and optimizes them for running on an arbitrary target processor. Sh can also include a modular backend system that maps an internal representation of desired computations to concrete programs suitable for execution on a given target processor using a specific target language or interface. In one embodiment, backend modules are provided in the Sh distribution for both the host CPU (enabling dynamic generation of code for the host CPU) and multiple GPUs. Sh also includes a data-management component that enables the management of textures and parameters using the object-oriented programming features of C++. The Sh system is modular and permits the addition of new language features and new compilation targets by the user.

Although this specification focuses on the use of the Sh system, it should be apparent to one skilled in the art that any metaprogramming system with similar capabilities may be substituted therefor without departing from the spirit or the scope of the invention.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of at least one embodiment of the invention.

In the drawings.

DETAILED DESCRIPTION OF AN EMBODIMENT

Reference will now be made in detail to the preferred embodiments of the present invention, examples of which are illustrated in the accompanying drawings.

As described above, if only planar surfaces are to be considered, all rays (primary as well as secondary) can be seen as originating from one point, that of the virtual camera. Such an image could easily be generated using rasterization. However, if reflections, refractions, or other such optical distortions exist in the scene, such as, without limitation, those naturally occurring on curved surfaces such as vehicle windshields, all secondary rays originate from different points and it is therefore necessary to handle these rays separately using ray tracing.

In one embodiment, only selected surfaces where ray tracing effects (e.g. reflections or refraction) are apparent are rendered using ray tracing, with other parts of the image rendered using rasterization. More specifically, only secondary rays (those reflected or refracted off surfaces, or otherwise not meeting at a common origin) need to be raytraced. In one embodiment, to cast rays from rasterized surfaces, the world-space position of polygons being rasterized are interpolated from vertex attributes, and if these polygons are reflective or refractive, a per-fragment shader is invoked that implements a ray tracing algorithm for secondary rays instead of the normal surface shader. The actual ray tracing method is implemented on the same hardware used for rasterization, by exploiting the high-performance computational abilities of shaders.

Figure 1:
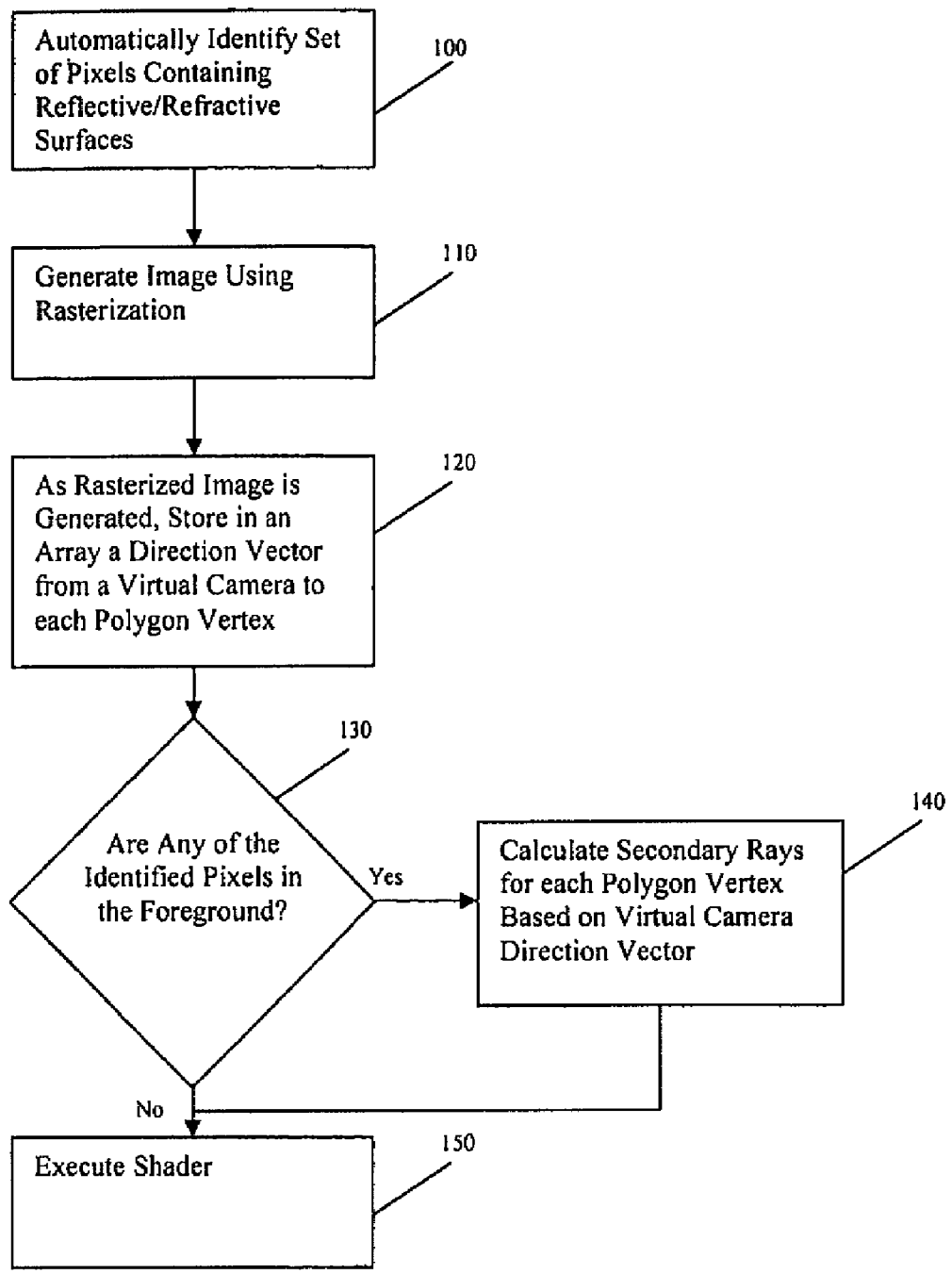
FIG. 1 is a block diagram illustrating a hybrid rasterization and raytracing image generation method.

In the embodiment illustrated in FIG. 1, a hybrid image generation method begins with the automatic evaluation of the image to be generated to determine which pixels contain polygon vertices that include reflective and/or refractive surfaces (Block 100). The image is then generated using rasterization (Block 110). As the rasterized image is generated, an array is created that contains a directional vector from a virtual camera that is associated with each polygon vertex (Block 120). The pixels containing polygon vertices that include reflective and/or refractive surfaces are then evaluated (Block 130) to determine whether the reflective and/or refractive polygon vertices are in the foreground. For each such foreground polygon vertex, a secondary ray is generated from the polygon vertex using the directional vector associated with the polygon vertex (Block 140). A shader program is then invoked to accurately render the remainder of the image (Block 150). The shader invocation may result in additional, recursive secondary ray generation.

For other applications of ray tracing, for instance indirect illumination, glossy reflection, or soft shadows, rays may be spawned in different ways. However, the same approach can be taken: a shader can be written that computes the start point and direction of each ray, and it is only necessary to invoke the raytracer when rasterization cannot be used.

The ray tracer itself can be seen as a shader program, but when the ray hits other surfaces, a shader particular to that surface can be invoked to compute its colour. The computed colour of an object seen in a reflection (and rendered with ray tracing) should be consistent with the colour of the object when viewed directly (and rendered with rasterization), except for possible coloring effects from the reflecting object. It is advantageous for raytracing and rasterization to use the same shader programs to compute consistent colours, although the raytracing and rasterization algorithms may invoke the shader programs in different ways. For example, shader programs invoked directly by the rasterizer can use input parameters interpolated from vertices, whereas shader programs invoked by the raytracer will typically read their parameters from values interpolated by the raytracer algorithm from scene data stored in texture maps.

The two modes of shader usage can be integrated through the use of generative metaprogramming (the use of one program to generate or manipulate another). The raytracer is implemented as a framework, which implements the core algorithm but which is parameterized with a set of shader programs. For each particular scene, all the shader programs for that scene can be transformed to read from the scene data structure rather than from interpolated vertex attributes, and can be combined with the raytracer framework. The framework can then generate a custom raytracing shader specific to that scene. Transformation of shader programs can be done by a compiler that explicitly transforms an intermediate representation of the shader programs, such as Sh (described above), or by any other system with similar capabilities.

The combination of the raytracer and the shaders results in a single shader program which can both raytrace the scene and shade the intersection points. This master shader program can be used during rasterization to add raytraced effects to particular surfaces. The relevant scene geometry can also be stored in texture maps for access by this master shader.

A metaprogramming compiler can also take very complex shader programs and break them into multiple parts, with each of the parts capable of being rendered over multiple passes. This process is referred to as virtualization, and is described in more detail in [Chan 2002, Riffel 2004, Foley 2004]. A metaprogramming compiler can also virtualize control flow if necessary by converting it into multiple passes (a generalization of the techniques presented by Timothy J. Purcell et al., *Ray Tracing on Programmable Graphics Hardware*, in Proceedings of ACM SIGGRAPH, 703-712 (2002)).

This is especially useful in this context since a scene with a large number of shaders will result in a very large master shader to raytrace that scene.

The master shader should also support conditional execution of surface shaders, so that only the code needed for the surface hit is invoked. Using the early occlusion test supported in graphics hardware, which tests the depth before invoking a shader and omits shader invocation if the colour would not be written, and by breaking the shader into multiple passes, the ray tracing of scenes with large numbers of shaders can be efficiently implemented, even though the shader execution model is data-parallel and does not natively support conditional execution.

It is advantageous to utilize a metaprogramming system because current generation GPUs have some limitations. By way of example, without intending to limit the present invention, such limitations may include limitations in the number of variables that can be calculated, the number of usable instructions is limited, and the available memory is restricted. If the size of a shader is too big, the shader cannot be executed by the GPU. In the prior art, such shaders must be split in smaller pieces by hand. The metaprogramming system provides automatic shader segmentation. The shader itself may be written in a C-like programming language and can be converted in an assembler program. During this conversion the automatic segmentation is so accomplished that the resulting assembler segments can be executed by the GPU.

As the image is rendered, the appropriate shader must be selected for a given surface. The problem is that the master shader comprises all surface shaders of the scene, and is thus too large to be able to be processed by the GPU. The master shader is shortened through a selection of the shader to be rendered, wherein this selection is already made on the side of the host application at the metalanguage level. Thus, the metalanguage can act as an optimizer.

Figure 2:
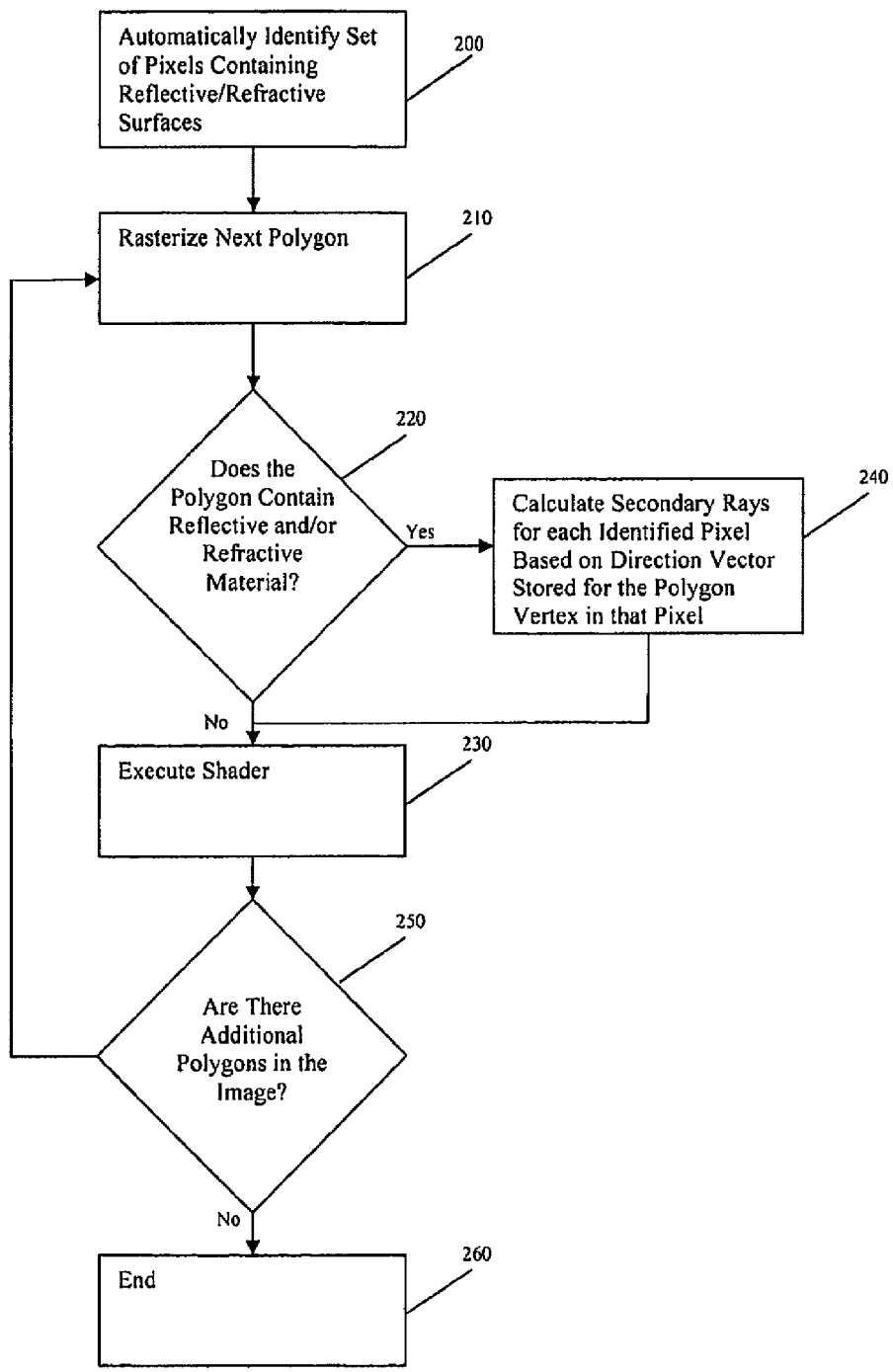
FIG. 2 is a block diagram illustrating an alternative hybrid rasterization and raytracing image generation method.

In the embodiment illustrated in FIG. 1, the whole scene is rasterized first, and the raytracing step is performed only for those polygons which are detected to be visible in the foreground and for which ray tracing is detected to be necessary. FIG. 2 illustrates an alternative approach. In the embodiment illustrated in FIG. 2, the image information is scanned and each polygon containing reflective and/or refractive material is identified (Block 200). Each polygon is then rasterized (Block 210) and, if the polygon has reflective and/or refractive material (Block 220) it is immediately raytraced (Block 250). A shader is then executed (Block 240). This is repeated (Block 260) for each polygon until the scene is rendered. However, since this embodiment performs raytracing for polygons which are not ultimately visible, the embodiment described above with respect to FIG. 1 is presently preferred.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method comprising the steps:
    evaluating, using at least one computing device, an image, wherein a plurality of pixels that relate to polygon vertices are identified, each of the vertices including at least one property selected from the list: reflective material, refractive material;
    generating, using the at least one computing device, the image using rasterization, wherein an array, stored on a computer readable medium, is created that comprises a directional vector from a virtual camera that is associated with each polygon vertex;
    evaluating, using the at least one computing device, each of the plurality of pixels to determine if the respective pixel is in a foreground of the image;
    generating, using the at least one computing device, a secondary ray for each pixel in the foreground of the image, wherein the secondary ray is generated from the respective pixel by using the directional vector associated with the polygon vertices to which the respective pixel relates;
    wherein the rasterizing further comprises the use of at least one shader on any object in the scene, and wherein the at least one shader is applied to the at least one spawned secondary ray intersecting with said object in the scene.

2. The method of claim 1, wherein the shader is applied using a Graphics Processing Unit.

3. The method of claim 2, wherein a metaprogramming system is used to instruct the Graphics Processing Unit.

4. The method of claim 3, wherein the metaprogramming system automatically segments the shader.

5. The method of claim 3, wherein the metaprogramming system automatically segments the shader for a particular manufacturer's Graphics Processing Unit.

6. A method comprising the steps:
    evaluating, using at least one computing device, an image, wherein a plurality of pixels that relate to polygon vertices are identified, each of the vertices including at least one property selected from the list: reflective material, refractive material;
    generating, using the at least one computing device, the image using rasterization, wherein an array, stored on a computer readable medium, is created that comprises a directional vector from a virtual camera that is associated with each polygon vertex;
    evaluating, using the at least one computing device, each of the plurality of pixels to determine if the respective pixel is in a foreground of the image;
    generating, using the at least one computing device, a secondary ray for each pixel in the foreground of the image, wherein the secondary ray is generated from the respective pixel by using the directional vector associated with the polygon vertices to which the respective pixel relates;
    generating a master shader, using the at least one computing device, the master shader comprising relevant scene geometry;
    segmenting the master shader, using the at least one computing device, using a metaprogramming system;
    rendering, using the at least one computing device, the remainder of the image using the master shader.

* * * * *